3,070,592
DISAZO INDOLE DYES
Hans Baumann, Dieter Leuchs, and Reinhold Krallmann, all of Ludwigshafen (Rhine), Germany, assignors to Badische Anilin- & Soda-Fabrik Aktiengesellschaft, Ludwigshafen (Rhine), Germany
No Drawing. Filed Dec. 28, 1960, Ser. No. 78,858
Claims priority, application Germany Jan. 2, 1960
6 Claims. (Cl. 260—165)

This invention relates to new disazo dyes of the para-(phenylazo)-benzene-azo-indole series, their production and their use for dyeing and printing textile materials and shaped articles of semisynthetic and fully synthetic substances, especially for dyeing and printing textile materials of synthetic polyamides.

The term "textile materials" includes fibers, flock, threads, woven fabrics, and non-woven fabrics. The term "shaped articles" includes films and sheets. Semisynthetic and fully synthetic substances include cellulose esters, such as cellulose 2½-acetate and cellulose triacetate, linear synthetic polyurethanes, linear synthetic polyesters, such as polyethylene terephthalate, and linear synthetic polyamides, such as nylon 6, nylon 66 and nylon 11.

It is obvious that of the conventional dyes it is generally those which show a high light fastness which are preferred for dyeing textile materials. Thus, for example, heavy metal complexes of ortho, ortho'-dihydroxy-azo dyes, for example the corresponding chromium and cobalt complexes, are used to a considerable extent for dyeing linear synthetic polyamides because they are very fast to light. These heavy metal complexes have the disadvantage however that the dyeings produced therewith are rather dull or cloudy. If bright shades are to be obtained it is necessary to revert to suitable metal-free azo dyes, but these dyes do not usually exhibit the desired degree of light fastness.

Another disadvantage of the above-mentioned heavy metal complexes lies in the fact that fabrics of linear synthetic polyamides dyed therewith are often reedy.

Reed marks can be explained as follows: Fibers of synthetic material, e.g. synthetic polyamides, are stretched after spinning, the desired textile and mechanical properties thus being imparted thereto. The fibers, which originally are substantially amorphous, pass into a substantially crystalline state. The fibers are not in general uniformly crystalline over their whole length, but strongly crystalline regions alternate with less crystalline regions. The less crystalline regions take up most of the dyes—including the metalliferous dyes—more readily than the strongly crystalline regions, so that the above-mentioned irregularity in the dyeing comes about.

It is an object of the present invention to provide new dyes which will dye textile materials of linear synthetic polyamides very uniformly and without reed marks.

Another object of this invention is to provide dyes of which dyeings, for example on linear synthetic polyamides, also exhibit very good light fastness.

A further object of the invention is to provide dyes which will dye synthetic materials, for example linear synthetic polyamides, very bright shades.

The dyes of the invention can be represented by the formula:

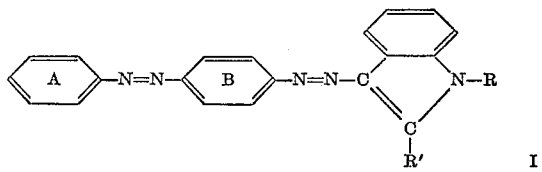

I in which R denotes a hydrogen atom or a short-chain or lower alkyl group, for example an alkyl group containing 1 to 4 carbon atoms, such as methyl, ethyl, propyl and butyl; and R' stands for a short-chain or lower alkyl group containing 1 to 4 carbon atoms, for example, a methyl, ethyl, propyl or butyl group, or for an aromatic group, such as a phenyl group, which in turn can be substituted in the nucleus by non-ionic substituents, i.e., substituents which do not dissociate in a neutral aqueous medium, for example, by lower alkyl groups, such as methyl or ethyl groups, or halogen atoms, such as chlorine and bromine atoms.

The benzene rings A and B may contain non-ionic substituents which usually occur in water-insoluble azo dyes. Such substituents include the lower alkyl groups, such as the methyl, ethyl, propyl or butyl groups, lower alkoxy groups containing 1 to 4 carbon atoms, such as the methoxy, ethoxy, or propoxy group, or halogen atoms such as chlorine, bromine or iodine atoms. Other substituents, e.g., an acetylamino group or a sulfonamide group may also be present. In general, substituents which make the dye water-soluble should not be attached to the benzene nuclei A and B. In particular, the dyes should be free of sulfonic acid and carboxylic acid groups.

The preferred dyes of this invention have the general formula:

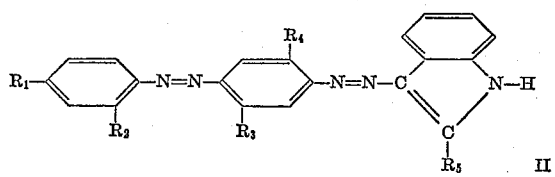

II in which $R_1$ denotes a hydrogen atom, a chlorine atom, a methoxy group or a sulfonic acid amide group, $R_2$ denotes a hydrogen atom or a methyl group, $R_3$ and $R_4$ each denotes a hydrogen atom, a methyl group, a methoxy or ethoxy group and $R_5$ denotes a methyl or phenyl group.

The new dyes of this invention are obtained by coupling a diazotized amino-azobenzene of the general formula:

III or, in the case of the preferred dyes of this invention, a diazotized amino-azobenzene of the general formula:

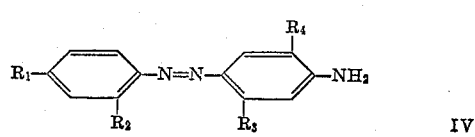

IV with an indole of the general formula:

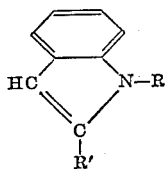

or, in the case of the preferred dyes of this invention, an indole of the general formula:

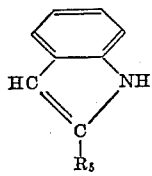

the symbols A, B, $R_1$, $R_2$, $R_3$, $R_4$, R, R' and $R_5$ having the meanings given above.

Suitable amino-benzenes of the Formula VI or VII include 4-aminoazobenzene, 4-amino-2-methylazobenzene, 4-amino-2-methoxyazobenzene, 4-amino-2,5-dimethylazobenzene, 4-amino-2,4'-dimethoxyazobenzene, 4-amino-2,5-dimethoxyazobenzene-4'-sulfonic acid amide and 4-amino-2-methyl-4'-chlorazobenzene.

Coupling components include 2-methylindole, 2-phenylindole, 1,2-dimethylindole and 1-methyl-2-phenylindole.

For dyeing and printing the above-mentioned textile materials of semisynthetic or fully synthetic substances, the dyes of this invention are advantageously used in finely divided form, textile materials of cellulose 2½-acetate advantageously being dyed at temperatures of 70° to 80° C., those of cellulose triacetate, linear synthetic polyamides and linear synthetic polyesters at temperatures of 90° to 100° C. or at increased pressure at temperatures above 100° C. The dyebath may contain the usual dyeing auxiliaries, such as dispersing agents usual in the application of water-insoluble dyes, and also, to increase the speed of absorption, dyeing accelerators (carriers), such as ortho- and para-phenylphenol, ortho-hydroxybenzoic acid and ortho-hydroxybenzoic acid methyl ester.

In the printing of the above-mentioned textile materials the dyes of this invention are used in conjunction with thickening agents and preferably with the usual printing auxiliaries and the said dyeing accelerators. After printing, the fabric is treated for a short time with steam or hot air. The prints and dyeings obtained may be discharged white with the usual agents, such as sodium dithionite, formaldehyde sulfoxylate or formamidine sulfinic acid.

By using the new dyes of this invention, dyeings and prints are obtained with very good wet fastness properties, excellent waste gas fastness and excellent resistance to heat treatment, such as ironing, pleating and thermofixing. The light fastness of the dyeings, as already mentioned, is excellent.

The invention is illustrated by, but not limited to, the following examples which describe the production and use of the new dyes. The parts and percentages are by weight unless otherwise specified.

*Example 1*

197 parts of para-aminoazobenzene are stirred with 400 parts by volume of 10 N hydrochloric acid and 500 parts of water for several hours. The suspension of para-aminoazobenzene hydrochloride is then made up with water and ice to a volume of 5000 parts by volume and diazotized at 15° C. with an aqueous solution of 69 parts of sodium nitrite. After diazotization, the diazonium salt solution is coupled with a dispersion of 2-phenylindole which has been prepared by grinding 194 parts of 2-phenylindole with 300 parts of water and 40 parts of hydroxyethylated oleylamine in a ball mill for 24 hours. A pH of 3 to 4 is set up in the reaction mixture with aqueous sodium carbonate or sodium acetate solution. After coupling the reaction product is pressed off and dried; 400 parts of the orange disazo dye of the formula:

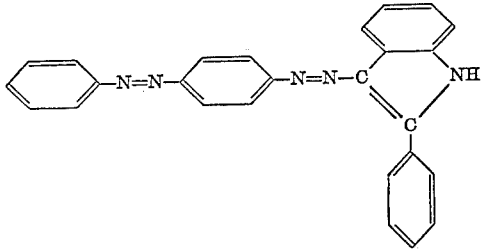

are obtained.

*Example 2*

By using 225 parts of ortho-aminoazotoluene instead of para-aminoazobenzene, 410 parts of the disazo dye of the formula:

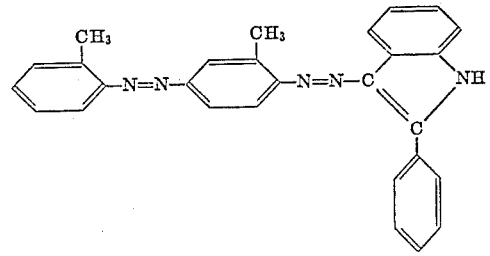

are obtained which dyes nylon 6 fabric extremely level and somewhat more reddish orange shades than the dye previously described.

*Example 3*

By replacing the 2-phenylindole in Example 1 by the equivalent amount of 2-methylindole, the dye of the formula:

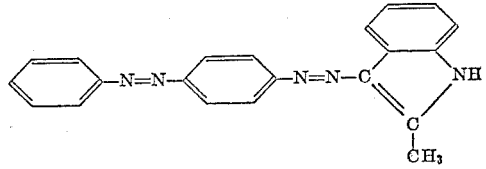

is obtained which gives very level reddish yellow dyeings on nylon 66 fabric.

*Example 4*

93 parts of aniline are diazotized in the usual manner and coupled with 153 parts of 2,5-dimethoxyaniline. The aminoazo dye thus obtained is filtered off under reduced pressure and stirred with 400 parts by volume of 10 N hydrochloric acid and 500 parts of water. The suspension is diluted with water to a volume of 5000 parts by volume and diazotized with 69 parts of sodium nitrite. The diazonium salt is coupled with a dispersion of 194 parts of 2-phenylindole prepared as described in Example 1. After isolation and drying, 450 parts of the disazo dye of the formula:

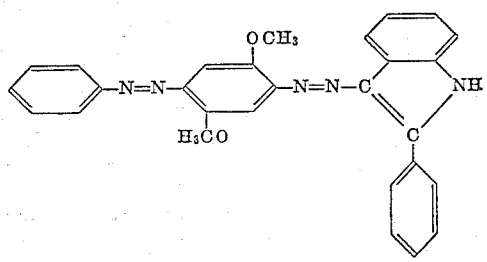

are obtained which dyes nylon 11 very level and powerful claret shades.

The following dyes can be prepared in an analogous manner:

| Example | Formula | Shade of dyeing on nylon 6 |
|---|---|---|
| 5 | C6H5—N=N—C6H3(OCH3)—N=N—C(Ph)=C(NH)—C6H4 (benzimidazole-type) | orange |
| 6 | H3CO—C6H4—N=N—C6H3(OCH3)—N=N—C(Ph)=C(NH)—C6H4 | scarlet |
| 7 | H3CO—C6H4—N=N—C6H2(OCH3)(OCH3)—N=N—C(Ph)=C(NH)—C6H4 | red |
| 8 | 3-H3C—C6H4—N=N—C6H4—N=N—C(Ph)=C(NH)—C6H4 | orange |
| 9 | C6H5—N=N—C6H4—N=N—C(Ph)=C(N—CH3)—C6H4 | orange |
| 10 | Cl—C6H4—N=N—C6H3(CH3)—N=N—C(Ph)=C(NH)—C6H4 | scarlet |
| 11 | H2NO2S—C6H4—N=N—C6H4—N=N—C(CH3)=C(NH)—C6H4 | orange |

| Example | Formula | Shade of dyeing on nylon 6 |
|---|---|---|
| 12 | H₃C—CO—NH—⟨⟩—N=N—⟨⟩—N=N—C(NH)=C(CH₃) [indole] | orange. |
| 13 | H₂NO₂S—⟨⟩—N=N—⟨⟩(OC₂H₅)(H₅C₂O)—N=N—C(NH)=C(phenyl) [indole] | red-violet. |

*Example 14*

100 parts of cellulose triacetate flock are dyed for 90 minutes at 95° to 100° C. in a bath of 3000 parts of water, 0.8 part of a finely divided disazo dye obtained from diazotized 4-aminoazo-benzene and 2-phenylindole (Example 1) and 3 parts of the reaction product derived from 1 mol of castor oil and 40 mols of ethylene oxide. An orange dyeing of excellent light and waste gas fastness and very good wet fastness properties is obtained.

*Example 15*

100 parts of polycaprolactam flock are dyed for 30 minutes at the boil in a bath of 2000 parts of water, 0.6 part of a finely divided disazo dye obtained from diazotized 4-amino-2,5-diethoxyazobenzene 4-sulfonic acid amide and 2-phenylindole (Example 13), 2 parts of 25% aqueous ammonia solution and 2 parts of the product obtained by adding on 80 mols of ethylene oxide to 1 mol of sperm oil alcohol and sulfonation. Then 4 parts of ammonium sulfate are added and dyeing is continued for another 30 minutes at 98° to 100° C. The bright red-violet dyeings obtained are very fast to light and wet treatment.

*Example 16*

A fabric of polyethylene terephthalate is printed with a paste of 360 parts of water, 600 parts of a natural gum thickening, 15 parts of a finely divided disazo dye obtained from diazotized 4-amino-2-methyl-4'-chlorazobenzene and 2-phenylindole (Example 10) and 25 parts of ortho-phenylphenol. The printed fabric is dried and treated for 15 minutes with steam at a pressure of 1.5 atmospheres gage. The bright scarlet-red dyeings obtained are very fast to light and wet treatment and have excellent thermal stability.

*Example 17*

100 parts of polyethylene terephthalate sheeting are dyed for 90 minutes at the boil in a bath of 3000 parts of water, 1.2 parts of a finely divided dye obtained from diazotized 4-aminoazobenzene and 2-phenylindole (Example 1) and 1.5 parts of the product obtained by adding on 80 mols of ethylene oxide to 1 mol of sperm oil alcohol and sulfonation. The orange-red dyeing obtained was excellent light and wet fastness and very good thermal stability.

*Example 18*

100 parts of nylon 6 fabric are dyed for 30 minutes at 50° C. in a bath of 3000 parts of water, 0.3 part of a finely divided disazo dye obtained from diazotized 4-aminoazobenzene and 2-methylindole (Example 3) and 2 parts of 85% aqueous formic acid. The temperature of the bath is then raised gradually to 98° C. in the following 90 minutes and this temperature is maintained for another 30 minutes. The bright orange-yellow dyeing is very fast to light and wet treatment and extremely level.

We claim:

1. Disazo dyes of the general formula:

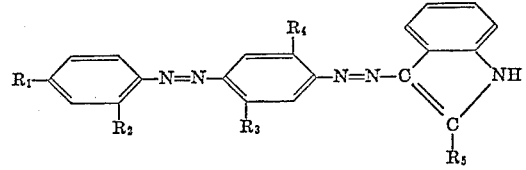

in which $R_1$ is a substituent selected from the class consisting of hydrogen, chlorine, methoxy and sulfonamide, $R_2$ is a substituent selected from the class consisting of hydrogen and methyl, $R_3$ and $R_4$ each represent a substituent selected from the class consisting of hydrogen, methyl, methoxy and ethoxy, and $R_5$ is a substituent selected from the class consisting of methyl and phenyl.

2. The disazo dye of the formula:

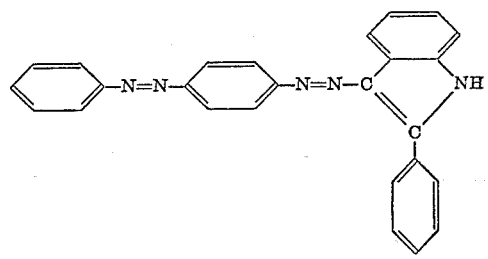

3. The disazo dye of the formula:

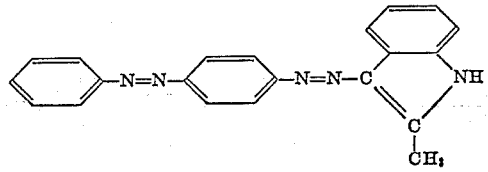

4. The disazo dye of the formula:
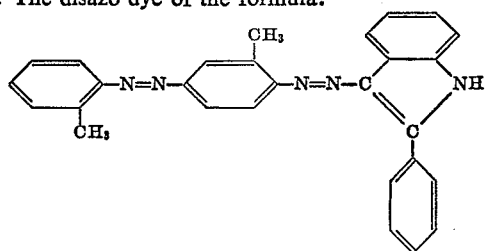
5. The disazo dye of the formula:
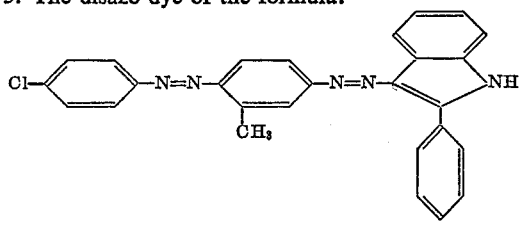
6. The disazo dye of the formula:
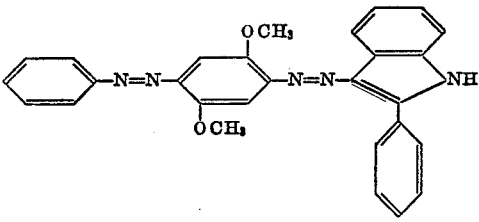
References Cited in the file of this patent
UNITED STATES PATENTS
| | | |
|---|---|---|
| 719,048 | Runkel | Jan. 27, 1903 |
| 719,049 | Runkel | Jan. 27, 1903 |
| 2,970,994 | Kruckenberg | Feb. 7, 1961 |